US012724789B2

(12) United States Patent
Niksa et al.

(10) Patent No.: US 12,724,789 B2
(45) Date of Patent: Sep. 1, 2026

(54) ETL CLUSTERING FOR REDUCTION OF DATA BLOAT

(71) Applicant: THE HUNTINGTON NATIONAL BANK, Columbus, OH (US)

(72) Inventors: Kyle Niksa, Columbus, OH (US); Ryan Brink, Columbus, OH (US); Shaun Rankin, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/006,573

(22) Filed: Dec. 31, 2024

(65) Prior Publication Data

US 2026/0187092 A1 Jul. 2, 2026

(51) Int. Cl.
*G06F 16/25* (2019.01)
*G06F 16/901* (2019.01)

(52) U.S. Cl.
CPC ........ *G06F 16/254* (2019.01); *G06F 16/9024* (2019.01)

(58) Field of Classification Search
None
See application file for complete search history.

(56) References Cited

U.S. PATENT DOCUMENTS 11,500,837 B1 * 11/2022 Reaz ..................... G06F 16/215
2007/0094060 A1 * 4/2007 Apps ................... G06F 16/2428 705/7.36
2013/0054646 A1 2/2013 Zizka et al.
2014/0280224 A1 * 9/2014 Feinberg ............. G06F 16/9024 707/748
2017/0126609 A1 5/2017 Sharifi et al.
2019/0138628 A1 * 5/2019 Walker .................. G06F 40/295
2021/0342319 A1 11/2021 Agarwal et al.
2025/0021585 A1 * 1/2025 Jain ......................... H04L 67/51

* cited by examiner

*Primary Examiner* — Umar Mian
(74) *Attorney, Agent, or Firm* — Kilpatrick Townsend & Stockton LLP.

(57) ABSTRACT

Metadata mapped to units of execution executed by components of a computing infrastructure and data created and/or used by the units of execution may be collected. The metadata may be consolidated and analyzed to identify units of execution mapped to similar or replicative data instances. Instances of potential data bloat mapped to at least a subset of the identified units of execution may be determined. Execution composites may be developed that may include specifications of at least the subset of the identified units of execution. A bloat reduction interface may be generated. The bloat reduction interface may be configured to represent at least the subset of identified units of execution and the instances of potential data bloat mapped to at least the subset of the identified units of execution and to facilitate bloat reduction actions with respect to units of execution of the subset of identified units of execution.

20 Claims, 6 Drawing Sheets

Cloud Infrastructure System
130-1
Infrastructure Resources
132
Cloud Services
134

102
102-1
102-2
102-3
102-n

Network(s)
110

130
112
112-1
112-2
112-n
114
114-n 140
112-5
112-6

ETL CLUSTERING FOR REDUCTION OF DATA BLOAT

TECHNICAL FIELD

This disclosure generally relates to computers systems and data management, and more particularly to systems, methods, and non-transitory, computer-readable media to facilitate extract, transform, load (ETL) clustering for reduction of data bloat.

BACKGROUND

In large-scale, multi-user computer systems, various users and teams may create jobs (i.e., units of execution) that move data within a system, for example, between databases. Over time, some units of execution may become repetitive. One unit of execution created by a first team could be taking data from one place and moving it to somewhere else, and then, maybe years down the line, a second team may need to move that same data around, but they do not know that a previous job is already doing that. So, the second team may create a new unit of execution for that same data, thereby creating or contributing to data bloat.

Data bloat may correspond to copying data all around to different databases and locations where it could be consumed somewhere else without having to create a new unit of execution for that. So, all the environments get bloated. There is code that is doing the same thing that existing code already does.

Conventionally, there is no good way of looking at all units of execution and systems, determining which one is bloated and which one is not, determining the interactions of multiple units of executions involving the same data, and efficiently facilitating cleaning or removing duplicative or outdated uses of the data. Thus, there is a need for systems, methods, and non-transitory, computer-readable media that systematically address and reduce data bloat. These and other needs are addressed by the present disclosure.

BRIEF SUMMARY

Certain embodiments according to the present disclosure relate generally to computers systems and data management, and more particularly to systems, methods, and non-transitory, computer-readable media to facilitate extract, transform, load (ETL) clustering for reduction of data bloat.

In one aspect, a system may facilitate reduction of data bloat. The system may include one or more processing devices and memory communicatively coupled with and readable by the one or more processing devices. The memory may include processor-readable instructions which, when executed by the one or more processing devices, cause the system to perform one or a combination of the following operations. Metadata mapped to units of execution executed by one or more components of a computing infrastructure may be collected, and data created and/or used by the units of execution may be collected. The metadata may be consolidated into one or more data repositories. The consolidated metadata may be analyzed to identify units of execution mapped to similar or replicative data instances. Based at least in part on the identified units of execution mapped to similar or replicative data instances, one or more instances of potential data bloat mapped to at least a subset of the identified units of execution may be determined. One or more execution composites may be developed that may include specifications of at least the subset of the identified units of execution. Based at least in part on the one or more execution composites, a bloat reduction interface may be generated. The bloat reduction interface may be configured to represent at least the subset of identified units of execution and the one or more instances of potential data bloat mapped to at least the subset of the identified units of execution and to facilitate one or more bloat reduction actions with respect to one or more units of execution of the subset of identified units of execution.

In another aspect, one or more non-transitory, processor-readable media having processor-readable instructions thereon which, when executed by one or more processing devices, may cause a system to perform one or a combination of the following operations. Metadata mapped to units of execution executed by one or more components of a computing infrastructure may be collected, and data created and/or used by the units of execution may be collected. The metadata may be consolidated into one or more data repositories. The consolidated metadata may be analyzed to identify units of execution mapped to similar or replicative data instances. Based at least in part on the identified units of execution mapped to similar or replicative data instances, one or more instances of potential data bloat mapped to at least a subset of the identified units of execution may be determined. One or more execution composites may be developed that may include specifications of at least the subset of the identified units of execution. Based at least in part on the one or more execution composites, a bloat reduction interface may be generated. The bloat reduction interface may be configured to represent at least the subset of identified units of execution and the one or more instances of potential data bloat mapped to at least the subset of the identified units of execution and to facilitate one or more bloat reduction actions with respect to one or more units of execution of the subset of identified units of execution.

In yet another aspect, a method may facilitate reduction of data bloat. The method may include one or a combination of the following. Metadata mapped to units of execution executed by one or more components of a computing infrastructure may be collected, and data created and/or used by the units of execution may be collected. The metadata may be consolidated into one or more data repositories. The consolidated metadata may be analyzed to identify units of execution mapped to similar or replicative data instances. Based at least in part on the identified units of execution mapped to similar or replicative data instances, one or more instances of potential data bloat mapped to at least a subset of the identified units of execution may be determined. One or more execution composites may be developed that may include specifications of at least the subset of the identified units of execution. Based at least in part on the one or more execution composites, a bloat reduction interface may be generated. The bloat reduction interface may be configured to represent at least the subset of identified units of execution and the one or more instances of potential data bloat mapped to at least the subset of the identified units of execution and to facilitate one or more bloat reduction actions with respect to one or more units of execution of the subset of identified units of execution.

In various embodiments, scanning of the one or more components of a computing infrastructure and the data created and/or used by the units of execution to identify or create the metadata may be caused. In various embodiments, the consolidating the metadata into the one or more data repositories may include developing a graph database based at least in part on the metadata, and the identifying the units of execution mapped to the similar or replicative data instances may be based at least in part on similarity analyses of the subgraphs of the graph database. In various embodiments, the bloat reduction interface may graphically indicate a composite structure that is constructed to indicate data relationships of the subset of identified units of execution. In various embodiments, the graphical user interface may graphically indicate how the one or more instances of potential data bloat emerged in the computing infrastructure. In various embodiments, the graphical user interface may include user-selectable interface elements corresponding to data nodes and unit of execution nodes of the composite structure. In various embodiments, the user-selectable interface elements may be selectable to cause the one or more bloat reduction actions with respect to a selected data node and/or a selected unit of execution node.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

As disclosed herein, embodiments according to the present disclosure provide technological solutions to multiple problems existing with conventional systems and approaches. The technical improvements provided by disclosed embodiments over prior technologies include improvements in data bloat identification and reduction. By way of example, various embodiments may provide for, among other things, analyzing all units of execution and systems, determining which one is bloated and which one is not, determining the interactions of multiple units of executions involving the same data, and efficiently facilitating cleaning or removing duplicative or outdated uses of the data.

Figure 1:
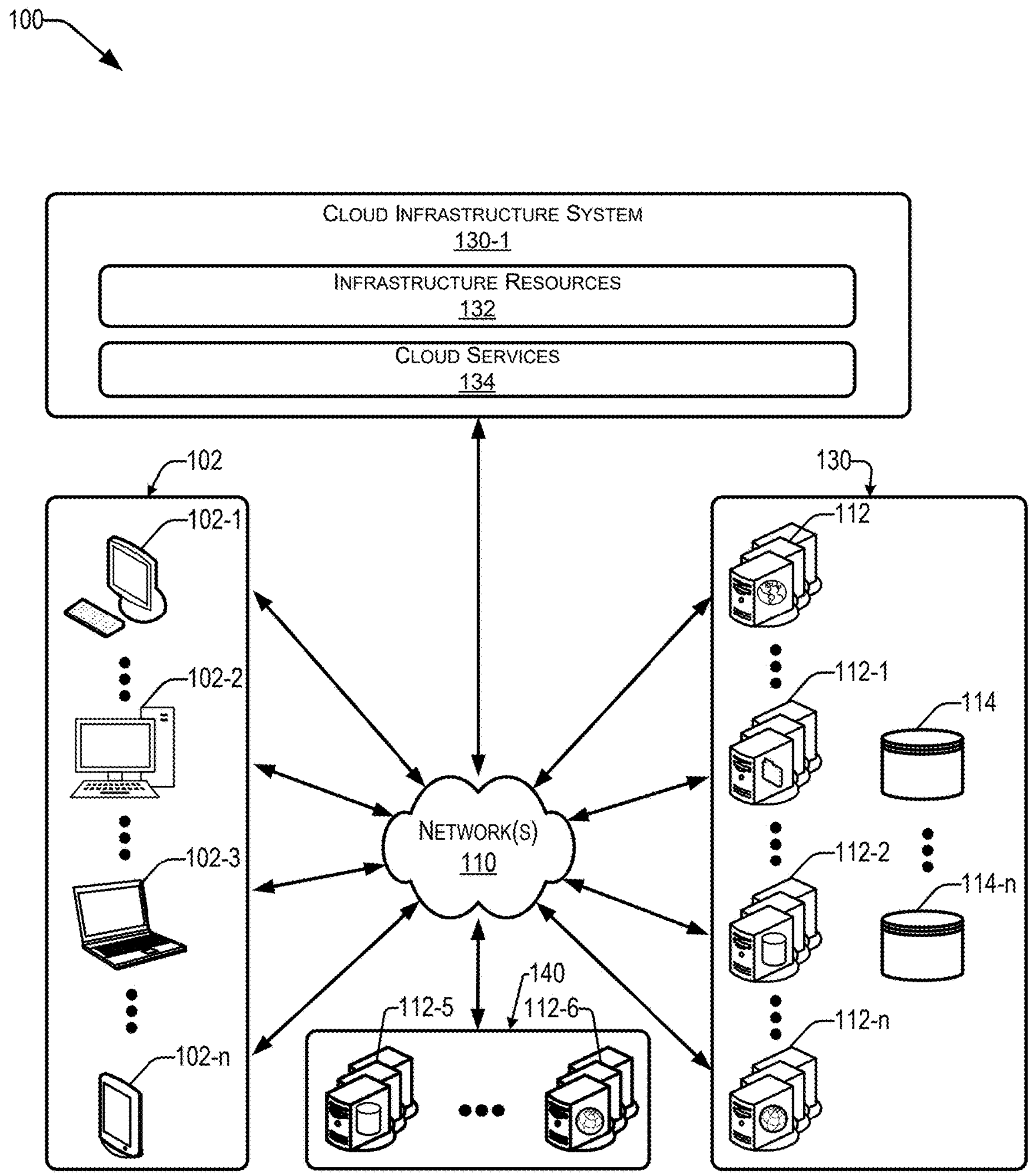
FIG. 1 illustrates computing infrastructure for implementing disclosed embodiments in accordance with present disclosure.

Various embodiments will now be disclosed in greater detail with reference to the accompanying figures, beginning with FIG. 1. FIG. 1 depicts a simplified diagram of computing infrastructure 100 for implementing disclosed embodiments in accordance with present disclosure. The selection and/or arrangement of components depicted in FIG. 1 are shown only by way of example and are not meant to be limiting. As in the illustrated embodiment, the computing infrastructure 100 (which may be referenced as "system 100" herein) may correspond to a system that includes one or more client computing devices 102, which may be configured to execute and operate a variety of applications, which may include, for example, a client application such as a web browser, proprietary client, or the like over one or more networks 110, which may include one or more internal networks and/or one or more external networks.

In some embodiments, the computing infrastructure 100 may include a server system 130, which may be on premises and/or remote from the client computing devices 102. The server system 130 may include one or more servers 112. The servers 112 may be communicatively coupled with the remote client computing devices 102 via the one or more networks 110. In various embodiments, the servers 112 may be adapted to run one or more services or software applications provided by one or more of the components of the computing infrastructure 100.

Software components may be implemented on one or more of the servers 112 and/or the client computing devices 102. Users operating the client computing devices 102 may utilize one or more client applications to use the services provided by components of the computing infrastructure 100. Various components of the computing infrastructure 100 may be implemented in hardware, firmware, software, or combinations thereof. It should be appreciated that various system configurations are possible, which may be different from the example of the computing infrastructure 100.

The embodiment shown in the figure is thus one example of a computing infrastructure 100 for implementing embodiments according to the present disclosure and is not intended to be limiting.

The client computing devices 102 may be portable handheld devices (e.g., a smartphone, a touchscreen tablet computer, a personal digital assistant or wearable devices), running software such as a variety of mobile operating systems such as iOS, Windows Phone, Android, and the like, and being Internet, e-mail, short message service (SMS), or other communication protocol enabled. Alternatively, or in addition, the client computing devices 102 may be general-purpose personal computers including, by way of example, personal computers and/or laptop computers running various operating systems. Alternatively, or in addition, the client computing devices 102 may be workstation computers running any of a variety of operating systems. Alternatively, or in addition, the client computing devices 102 may be any other electronic device, such as a thin-client computer, and/or a personal messaging device, capable of communicating over the network(s) 110. Although a number of the client computing devices 102 is illustrated, any number of client computing devices 102 may be supported.

The network(s) 110 may be any type of network or combination of types of networks familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 may be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks. Various components of the computing infrastructure 100 may include various network interfaces to facilitate communications between the client computing devices 102, one or more server systems 130, one or more remote systems 140, and/or a cloud infrastructure system 130-1. In some embodiments, some of the interfaces may include or otherwise correspond to API interfaces to transmit to and/or receive communications from one or a combination of the components of the computing infrastructure 100 using APIs.

Each server 112 may be composed of one or more general-purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more servers 112 may be adapted to run one or more services or software applications described in the present disclosure. For example, one or more servers 112 may correspond to a server for performing processing described above according to an embodiment of the present disclosure.

Each server 112 may run an operating system, including any available server operating system. Each server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. In various embodiments, the servers 112 may include aggregation servers that share data with data storage servers via the one or more networks 110, which may include one or more internal networks. The data storage servers may be configured to store data and may include database servers, file storage servers, and other similar data storage servers. In various embodiments, the servers 112 may include interface servers that may provide one or more interfaces applications to interact with the other elements of the system 100. The interface servers may provide the one or more interfaces and communicate with the other elements of the system 100 via the one or more networks 110. The interfaces generated by the interface servers may be used by the client computing devices 102 to interact with elements of the system 100.

In some embodiments, one or more of the servers 112 may include one or more applications to analyze and consolidate resource data feeds and/or event resource updates received from one or more components of the system 100. For example, unit of execution data feeds and/or unit of execution event updates may include, but are not limited to, real-time unit of execution data updates detected from scanning operations disclosed herein, which may include real-time unit of execution events related to new units of execution and/or creation of data per units of execution and/or the like, to facilitate monitoring for new instances of data bloat. One or more of the servers 112 may also include one or more applications to display the unit of execution data feeds and/or unit of execution real-time events, and/or data bloat visualizations (such as those disclosed herein) via one or more display devices of the client computing devices 102.

The computing infrastructure 100 may also include one or more databases 114. The databases 114 may reside in a variety of locations. By way of example, one or more of the databases 114 may reside on a non-transitory, storage medium local to (and/or resident in) one or more servers 112. Additionally or alternatively, one or more databases 114 may be remote from the servers 112 and in communication with the servers 112 via network-based or dedicated connection. In various embodiments, one or more databases 114 may reside in a storage-area network (SAN), NAS (Network Attached Storage), or cloud storage capabilities, such as block, file, or object storage. Similarly, any necessary files for performing the functions attributed to the servers 112 may be stored locally on the servers 112 and/or remotely, as appropriate. In one set of embodiments, the databases 114 may include relational databases that are adapted to store, update, and retrieve data in response to SQL-formatted commands.

The computing infrastructure 100 may include a cloud infrastructure system 130-1 that may be configured to provide infrastructure resources 132 and cloud services 134 made available to the client computing devices 102 via the one or more networks 110, which may include the Internet. The cloud infrastructure system 130-1 may include a server system, such as the server system 130. Although illustrated separately, in some embodiments, the cloud infrastructure 130-1 may include the server system 130 and provide cloud services to the client computing devices 102. In some embodiments, the cloud infrastructure 130-1 may include a version of the server system 130 and provide cloud services to the client computing devices 102, while the client computing devices 102 may additionally use the resources of the server system 130 such that the server system 130 may be on premises or remote with respect to the client computing device is 102. Accordingly, in various embodiments, resources may be provided to the client computing devices 102 by on-premises server system, remote server system, and/or cloud services.

The cloud infrastructure system 130-1 may include infrastructure resources 132 for providing the resources used to provide various services to clients. In various embodiments, the cloud services 134 provided by the cloud infrastructure system 130-1 may include a host of services that are made available to the client computing devices 102 on demand, such as online data storage and backup solutions, hosted office suites and document collaboration services, database processing, managed technical support services, and the like. The cloud services 134 may include infrastructure services that facilitate the management and control of the underlying computing resources, such as storage, networks, and other fundamental computing resources for clients. The cloud-provisioned resources may include resources shared by multiple users and dynamically re-allocated per demand, and pre-integrated and optimized combinations of hardware, such as servers, storage, and networking resources to execute services.

In various embodiments, the cloud services may include one or more services of various types such as Infrastructure as a Service (IaaS), Database as a Service (DbaaS), Platform as a Service (PaaS), Software as a Service (SaaS), and/or other services including hybrid services. The underlying software and infrastructure for providing the clouds services may be managed and controlled by the cloud infrastructure system 130-1. In some examples, a cloud service may include protected computer network access to remote storage on the cloud through the Internet, a hosted database, a hosted web server, a software application, database cloud services, middleware cloud services, and Java cloud services, and/or the like. For example, a cloud service may include a web-based service, a web service-based hosted, a script-language middleware engine for use by a networked developer, and/or the like.

In some implementations, the computing infrastructure 100 may also include one or more remote service provider systems 140 (also referenced herein as remote systems 140), each of which may be communicatively couplable with the client computing devices 102 via the networks 110. The remote systems 140 may provide services that provide resource data supporting data bloat management features disclosed herein. In some implementations, the one or more remote systems 140 may be, include, or otherwise correspond to one or more bloat-monitoring systems that may be configured to monitor units of execution and corresponding data instances created by components of the infrastructure 100. In various embodiments, in addition or alternative, the bloat-monitoring may be performed by the server system 130 and/or the cloud infrastructure system 130-1 such that one or a combination of the one or more remote systems 140, the server system 130, and/or the cloud infrastructure system 130-1 may perform the resource monitoring and may be bloat-monitoring systems.

In various embodiments, the bloat monitoring of units of execution and corresponding data instances created may be based at least in part on one or a combination of monitoring software installed on one or more servers of the server system 130 and/or the cloud infrastructure system 130-1, one or more APIs that define protocols and routines for interfacing with the resource data sources with calls to/from the resource data sources via an API interface, and/or the like. In various embodiments, Secure Shell (SSH), Telnet, Simple Network Management Protocol ("SNMP"), and/or any other suitable protocol may be used to facilitate communications between the bloat-monitoring system(s) and other components of the infrastructure. By way of example, to gather bloat data, the bloat-monitoring system may run one or more scripts, select one or more servers, establish one or more communication pipes to the one or more servers, log into the one or more servers for command line access via a transport layer by, for example, IP address and any suitable protocol, and pull bloat data from the one or more servers. Other embodiments are possible.

Figure 2:
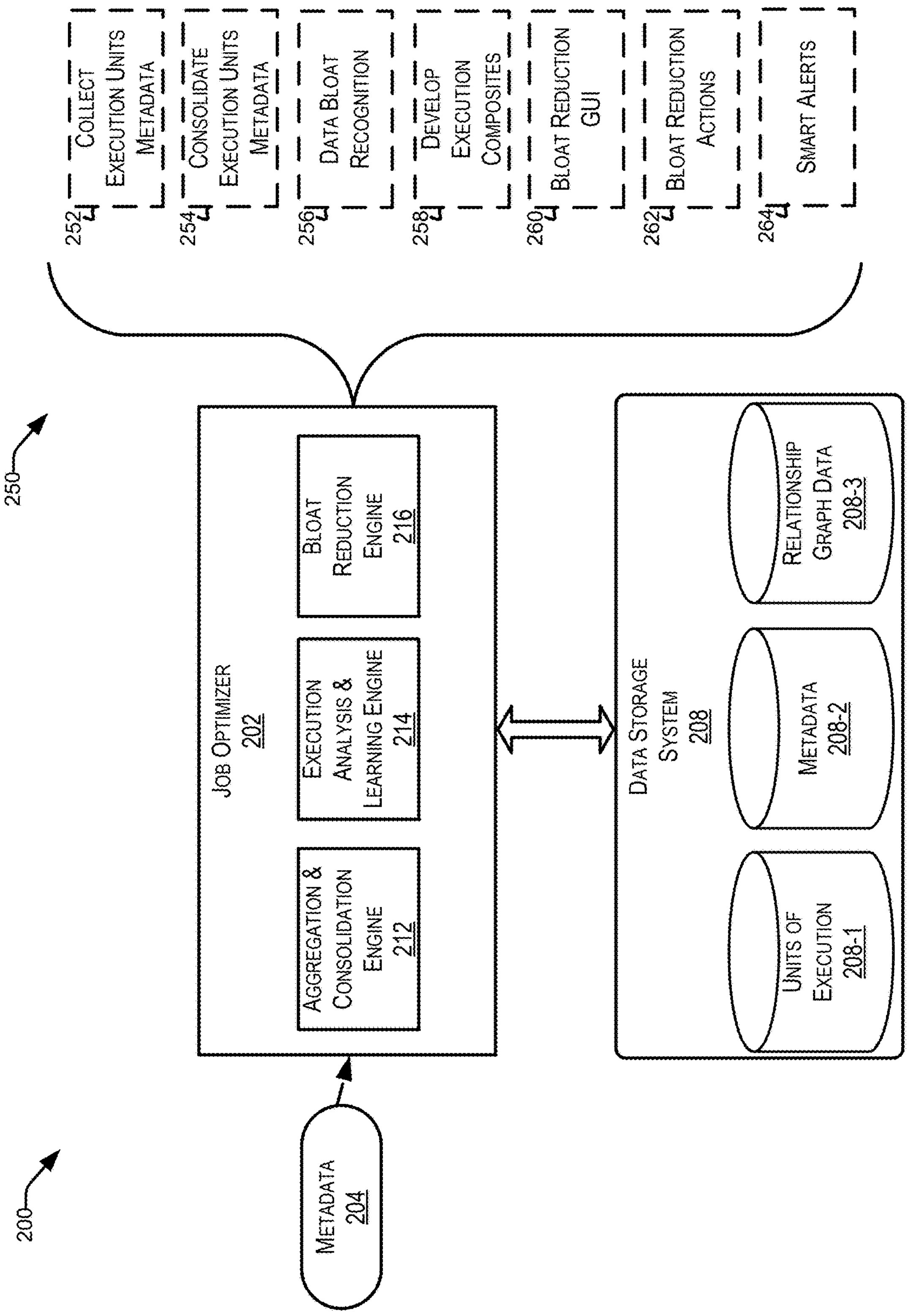
FIG. 2 illustrates a functional diagram for various embodiments of a job optimizer subsystem, in accordance with the present disclosure, in accordance with disclosed embodiments according to the present disclosure.

FIG. 2 illustrates a functional diagram for various embodiments of a job optimizer subsystem 200 ("subsystem 200"), in accordance with the present disclosure. The subsystem 200 may include one or more processors and one or more sets of memory, such as non-volatile memories. The processor(s) may include single or multicore processors. The processors may operate under the control of software stored in the associated one or more sets of memory. The one or more sets of memory may store instructions, that when executed by the one or more processors cause the subsystem 200 to perform one or more functions described herein.

In various embodiments, the subsystem 200 may include or otherwise be facilitated by one or a combination of the client computing devices 102, the server system 130, and/or the cloud infrastructure system 130-1. For example, the subsystem 200 may include a client computing device 102 using resources of the server system 130 and/or the cloud infrastructure system 130-1 to facilitate various features disclosed herein. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The subsystem 200 may include a job optimizer 202 (which may be referenced herein as "unit of execution optimizer 202" or "optimizer 202"). In some embodiments, the optimizer 202 may correspond to an optimizer tool. The optimizer 202 may include one or more aggregation and consolidation engines 212 (which may be referenced as "aggregation engine 212" or "consolidation engine 212" herein), one or more analysis and learning engines 214 (which may be referenced as "learning engine 214" herein), and/or one or more bloat reduction engines 216 (which may be referenced as "bloat reduction engine 216" herein), which may be separate or integrated in various embodiments. While the engines are shown separately, it should be appreciated that in various embodiments the engines may be combined or broken down further according to various features provided in various embodiments. The engines may be stored in memory and may include executable code and/or one or more software applications specially configured to provide the features disclosed herein, executable with one or more processors of the client computing devices 102, the server system 130, and/or the cloud infrastructure system 130-1 to provide the features disclosed herein. In various embodiments, the unit of execution optimizer 202 may correspond to one or a combination of the client computing devices 102, the server system 130, and/or the cloud infrastructure system 130-1 with a single, integral engine or separate engines working in conjunction. In some embodiments, the one or more of the engines 212, 214, and/or 216 may correspond to one or more servers. The engines may be configured to perform any of the steps of methods described in the present disclosure.

Figure 3:
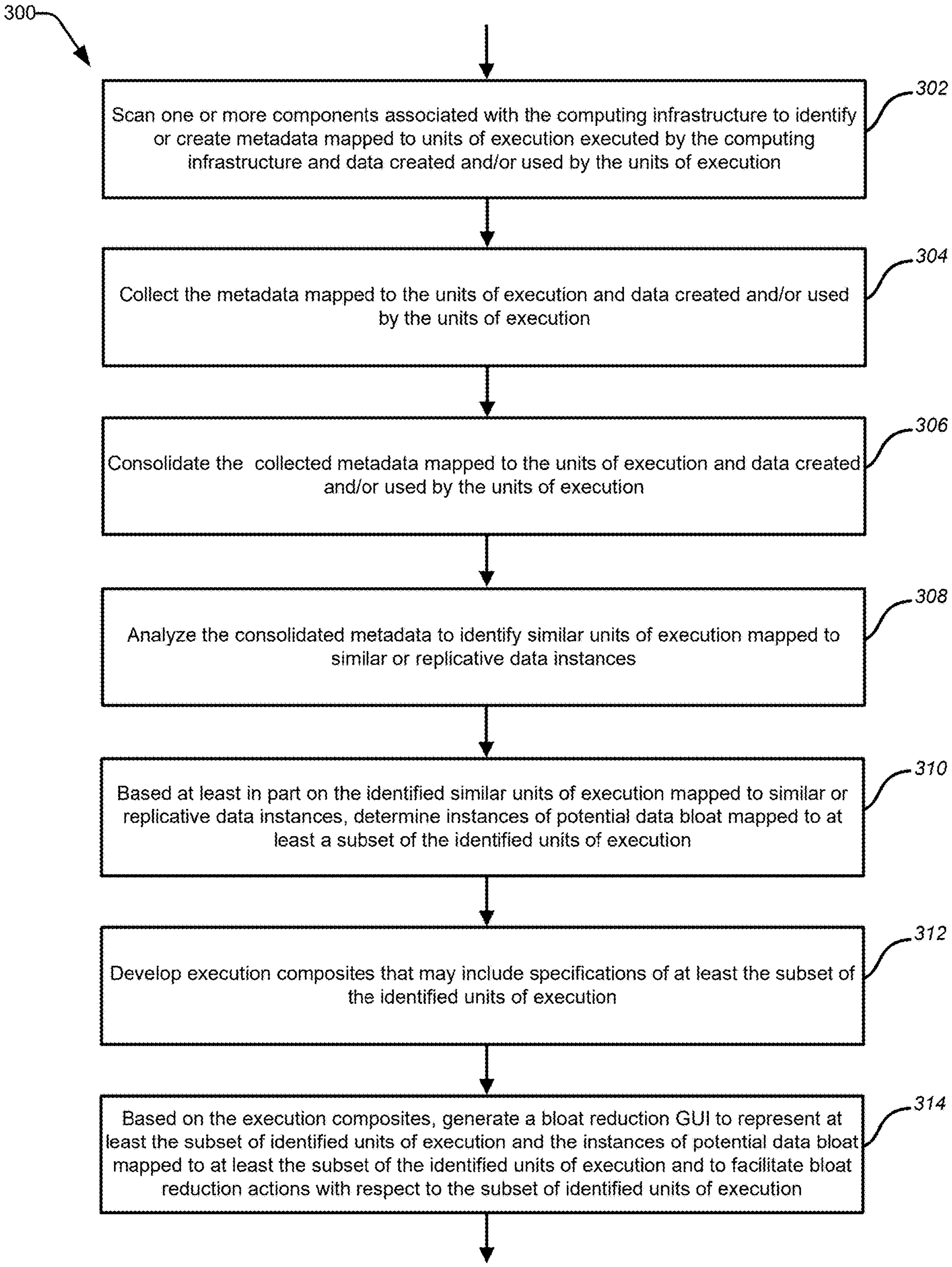
FIG. 3 illustrates an example method to facilitate reduction of data bloat, in accordance with the present disclosure, in accordance with disclosed embodiments according to the present disclosure.

FIG. 3 depicts an example method 300 to facilitate reduction of data bloat, in accordance with embodiments according to the present disclosure. However, teachings of the present disclosure may be implemented in a variety of configurations. As such, the order of the steps comprising the method 300 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously. Additionally, in some embodiments, the method 300 may be a portion of a graphical user interface (e.g., bloat reduction GUI 260) that can be exposed to one or more of the client computing devices 102.

As indicated by block 302, one or more components associated with the computing infrastructure 100 may be scanned to identify or create metadata mapped to units of execution executed by the computing infrastructure 100 and data created and/or used by the units of execution. As indicated by block 304, the metadata mapped to the units of execution and data created and/or used by the units of execution may be collected. As indicated by block 306, the collected metadata mapped to the units of execution and data created and/or used by the units of execution may be consolidated.

For example, referring again to FIG. 2, the subsystem 200 may be configured to provide a number of data bloat reduction features 250. With respect to some data bloat reduction features 250, the aggregation engine 212 may be configured to collect execution units metadata 252 and perform consolidation of the execution units metadata 254. The optimizer 202 may be communicatively coupled with interface components and communication channels configured to communicate with various components of the system 100 to facilitate the various features disclosed herein. For example, the aggregation engine 212 may be configured to scan all or some of the components of the system 100 that produce transformations of data between source and targets and to collect metadata 204 regarding the data transformations and of what data moves where within the system 100. This may include scanning all or some of the units of execution that occur and/or have occurred in the system 100 (e.g., are saved/stored as executable code, are executed by one or more components of the system 100, have been executed by one or more components of the system 100, and/or the like) and/or scanning logs of such units of execution that may be stored in one or more components of the system 100. In some embodiments, the components may include various extraction, transformation, and loading (ETL) systems or subsystems within the system 100. In some embodiments, the scanning may include scanning of one or more units of execution repositories 208-1 of a data storage system 208, which may store some or all of the units of execution, logs of units of execution, data uses and transformations, and/or the like. In various embodiments, the data storage system 208 may include one or a combination of one or more data storage servers and/or one or more databases that may reside in one or more locations. By way of example, the data storage system 208 may include one or more of the databases 114 or other databases like databases 114 that may be at least partially remote from the client computing devices 102 and/or may be at least partially local to the client computing devices 102, and/or may reside in the cloud infrastructure system 130-1.

The aggregation engine 212 may be configured to log the data transformations, the units of execution, and what data move where in the system 100. In some embodiments, the collecting of the metadata may include generating the metadata about the data transformations, the units of execution, and what data move where in the system 100. In various embodiments, the metadata may be already associated with the units of execution and data created and/or used by the units of execution such that the scanning may include analyzing and copying existing metadata. Additionally or alternatively, the scanning may include creating the metadata regarding the detected and analyzed units of execution and data created and/or used by the units of execution. In some embodiments, the aggregation engine 212 may use automated collectors/agents (e.g., ETL agents) to create, collect, and/or securely transport the metadata. In various embodiments, the aggregation engine 212 may scan components of the system 100 and collect the metadata via one or more data acquisition interfaces of the optimizer 202, which may include interfaces of the client computing devices 102, the server system 130, the cloud infrastructure system 130-1, and/or the like through network(s) 110 through any suitable means for transferring data. In some embodiments, the one or more data acquisition interfaces of the optimizer 202 may include one or more APIs that define protocols and routines for interfacing with the components of the system 100. The APIs may specify API calls to/from data source components, systems, and/or subsystems. The one or more data acquisition interfaces, in some embodiments, could use a number of API translation profiles configured to allow interface with the one or more additional applications of the data sources to access data (e.g., a database or other data store) of components of the system 100. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

The aggregation engine 212 may be configured to combine the metadata into one or more metadata repositories 208-2 of the data storage system 208. In various embodiments, the aggregation engine 212 may use rules to clean, consolidate, and curate the metadata, ensure data integrity, and otherwise prepare the metadata for storage, data analytics, machine learning, and/or identification of overlap and redundancies to facilitate improvements with respect to mitigating data bloat. This may include using the metadata to develop relationship data mapping all the relationships of where data is moving, how it moves, and identifiers and attributes of the units of execution that move it. In some embodiments, the consolidating the metadata may include populating relationship data into a graph database that allows for the expansion and laying out of the relationships with interconnected nodes and edges that represent the relationships between the nodes, allowing for querying and analyses of relationships between the data used by different units of execution. The relationship data and the graph database may be stored in one or more relationship graph data repositories 208-3.

Continuing with FIG. 3, as indicated by block 308, the consolidated metadata may be analyzed to identify similar units of execution mapped to similar or replicative data instances. As indicated by block 310, based at least in part on the identified similar units of execution mapped to similar or replicative data instances, instances of potential data bloat mapped to at least a subset of the identified units of execution may be determined. As indicated by block 312, execution composites that may include specifications of at least the subset of the identified units of execution may be developed. As indicated by block 314, based at least in part on the one or more execution composites, a bloat reduction interface may be generated. The bloat reduction interface may be configured to represent at least the subset of identified units of execution and the one or more instances of potential data bloat mapped to at least the subset of the identified units of execution. The bloat reduction interface may be further configured to facilitate one or more bloat reduction actions with respect to one or more units of execution of the subset of identified units of execution.

For example, referring again to FIG. 2, the data bloat reduction features 250 may include potential data bloat recognition 256. The learning engine 214 may be configured to analyze the relationship data stored in the graph database (e.g., segments or subsegments of the graph) to identify similar units of execution mapped to similar or replicative data instances. In some embodiments, learning engine 214 may implement ETL clustering to identify similar units of execution mapped to similar or replicative data instances.

The learning engine 214 may identify similar units of execution mapped to similar or replicative data instances based at least in part on similarity analyses of subgraphs (e.g., segments or subsegments of the graph) to identify similarities in where data is moving, how it moves, and identifiers and attributes of the units of execution that move it. In some embodiments, the ETL clustering may include or be based at least in part on the similarity analyses to identify similarities in where data is moving, how it moves, and identifiers and attributes of the units of execution that move it. The learning engine 214 may automatically determine similarities between the structures of units of execution and the data instances created and/or used by the units of execution. This may include analyzing all or some units of execution that generate, transform, and/or move data around the system 100 to identify structures that are similar to one another and create and/or use the same data with duplicative/replicative instances of the data. In some embodiments, any suitable similarity metric (e.g., a distance metric) may be used to calculate the similarities, identify pairwise similarities, and/or generate similarity matrices, which may then be used to cluster similar units of execution and data instances. In some embodiments, the learning engine 214 may assign similarity scores to the subgraphs to quantify the similarities.

The similarity analyses may include analyses to determine a degree of overlap for a plurality of units of execution in using particular data. A degree of overlap may correspond to the extent to which two or more units of execution use one or more of the same data and/or one or more the same data transformations. In some embodiments, a degree of overlap may correspond to a cumulative similarity score that is a function of individual similarity scores of subgraphs or subgraph components. The learning engine 214 may include logic to implement and/or otherwise facilitate any relationship analyses, similarity analyses, taxonomy, classification, categorization, correlation, mapping, data analytics, machine learning, qualification, scoring, organization, and/or the like to facilitate bloat reduction features disclosed herein. In some embodiments, the learning engine 214 may include or otherwise correspond to a machine learning module. In various embodiments, the learning engine 214 may employ one or more artificial intelligence (machine learning or, more specifically, deep learning) algorithms to perform similarity and pattern matching to identify data bloat. In some embodiments, a pattern-based reasoner and/or a transitive reasoner may be employed to use various statistical techniques in analyzing the data and determining relationships. Accordingly, the learning engine 214 may identify instances where potential data bloat may exist in the context of associated units of execution, how the potential data bloat emerged, and the relationships and characteristics of units of execution involved with the data bloat.

The data bloat reduction features 250 may include developing execution composites 258. For example, the aggregation engine 212 and/or the learning engine 214 may be configured to develop execution composites 258. Consequent to the learning engine 214 identifying a set of units of executions as being similar to one another (e.g., based at least in part on the ETL clustering in some embodiments), an execution composite 258 may be developed as a function of the set of similar units of execution and the metadata mapped to the units of execution and the data created and/or used by the units of execution. The data of the execution composites 258 may be curated and cleaned for use in the visualization and associated redundancy elimination features disclosed herein. The execution composite 258 may include specifications of the similar units of executions, the execution unit identifiers, the storage locations of the units of execution, mappings of host identifiers, times and dates at which the units of execution were created and/or modified, users associated with the units of executed (e.g., creator, executor, responsible users or teams, and/or the like), and/or the like. The execution composites 258 may be stored in the data storage system 208, for example, in the one or more units of execution repositories 208-1.

In some embodiments, the aggregation engine 212 and/or the learning engine 214 may hierarchically analyze the instances of potential data bloat that have been identified, as well as the similarities and overlap that has been identified with respect to duplicative data instances and similarly structured units of execution, to rank the instances of potential data bloat according to degrees of similarity and overlap. In so doing, the aggregation engine 212 and/or the learning engine 214 may employ one or more dynamic thresholds. The one or more dynamic thresholds may correspond to a similarity threshold and/or an overlap threshold. Instances of potential data bloat that have a similarity score and/or overlap score that satisfies the one or more dynamic thresholds may be identified as the most similar instances of potential data bloat. In some embodiments, only such instances may be selected for developing corresponding execution composites 258, at least initially. In some embodiments, the aggregation engine 212 and/or the learning engine 214 may use the ranking to select one or more of the most similar instances of data bloat for development of execution composites 258 and for presentation via a bloat reduction graphical user interface (GUI) 260. In some embodiments, indications of the ranking of the instances of potential data bloat may be presented via the boat reduction GUI 260, along with user-selectable interface options configured to allow a user to select one or more of the instances to examine further with visualizations has disclosed further herein.

Thus, in some embodiments, the subsystem 200 may recognize that, with large numbers of units of execution and corresponding instances of potential data bloat, not all of such need to be addressed equally or at the same time, but certain units of execution and corresponding instances of potential data bloat could have a higher priority than others. When no instances of potential data bloat are found to satisfy the one or more dynamic thresholds, the one or more dynamic thresholds may be lowered to identify potential instances. This may be expected as bloat is reduced over time in the system 100 and less extensive data remains in the system 100. Thus, in subsequent iterations of the bloat reduction measures disclosed herein, the one or more dynamic thresholds may be lowered to capture additional instances of potential data bloat for bloat reduction measures.

Moreover, in some embodiments, after a number of iterations of bloat reduction and consequent job optimizations per embodiments disclosed herein, some bloat reduction features 250 may only be executed when one or more data changes with respect to new or modified units of execution are detected. For example, in some embodiments, the scanning and metadata pulling processes to collect execution units metadata 252 may be automatically executed by the subsystem 200 in response to the subsystem 200 detecting a defined event. In various embodiments, the defined event may correspond to a defined time/date that may be repeated on a periodic basis (e.g., monthly, weekly, daily, hourly, etc.). The consolidating of execution units metadata 254 and the data below recognition 256 may only be executed when data changes are detected. The development of execution composites 258 and the development of one or more visualizations for the bloat reduction GUI 260 may be performed only when the similarities and/or overlap satisfy the one or more dynamic thresholds. In some embodiments, when the one or more dynamic thresholds are satisfied, the subsystem 200 may automatically notify one or more users. In some embodiments, such notifications may be transmitted to select individual accounts, for example, via email, instant messaging, push messages, and/or the like to alert (in some embodiments, in real time or near real time consequent to the bloat identification process and visualization generation being completed) responsible individuals about the identified bloat and recommended actions. The notifications may include a representation of the visualization of a composite structure (e.g., a full or partial screenshot, a report summarizing at least part of the composite structure, and/or the like) or a hyperlink to the condensed representation or the composite structure visualized provided with the bloat reduction GUI 260.

The data bloat reduction features 250 may include facilitating the bloat reduction GUI 260 using the execution composites 258. Using the execution composites 258, the subsystem 200 may create visualizations of sets of two or more units of execution selected and matched by the learning engine 214 for potential data bloat reduction that may be exposed via one or more interfaces of the subsystem 200. In some embodiments, an execution composite 258 may include a composite execution units model for two or more units of execution selected and matched by the learning engine 214 for potential data bloat reduction. The model may facilitate visualizations of the two or more units of execution with the bloat reduction graphical user interface 260 provided by the subsystem 200.

In some embodiments, the bloat reduction engine 216 may be configured to provide or otherwise facilitate the bloat reduction graphical user interface 260. The bloat reduction graphical user interface 260 may be a customized interface that may represent at least part of the execution composites 258. The bloat reduction graphical user interface 260 may, for example, be exposed to one or more of the client computing devices 102 to show: similarity analyses results of the learning engine 214; similarities in where data is moving, how it moves, and identifiers and attributes of the units of execution that move the data; similarities between the structures of units of execution; a degree of overlap for a plurality of units of execution in using particular data; relationships between the data and the units of execution; and/or the like. The bloat reduction graphical user interface 260 may allow for control of data bloat reduction with respect to the sets of two or more units of execution selected and matched by the learning engine 214 for potential data bloat reduction, with some embodiments allowing for causing or making remote changes to unit of execution configurations to reduce or fully eliminate the data bloat instance(s) identified in the sets of two or more units of execution. For example, the data bloat reduction features 250 may include bloat reduction actions 262, which may include smart alert 264 features.

Figure 4:
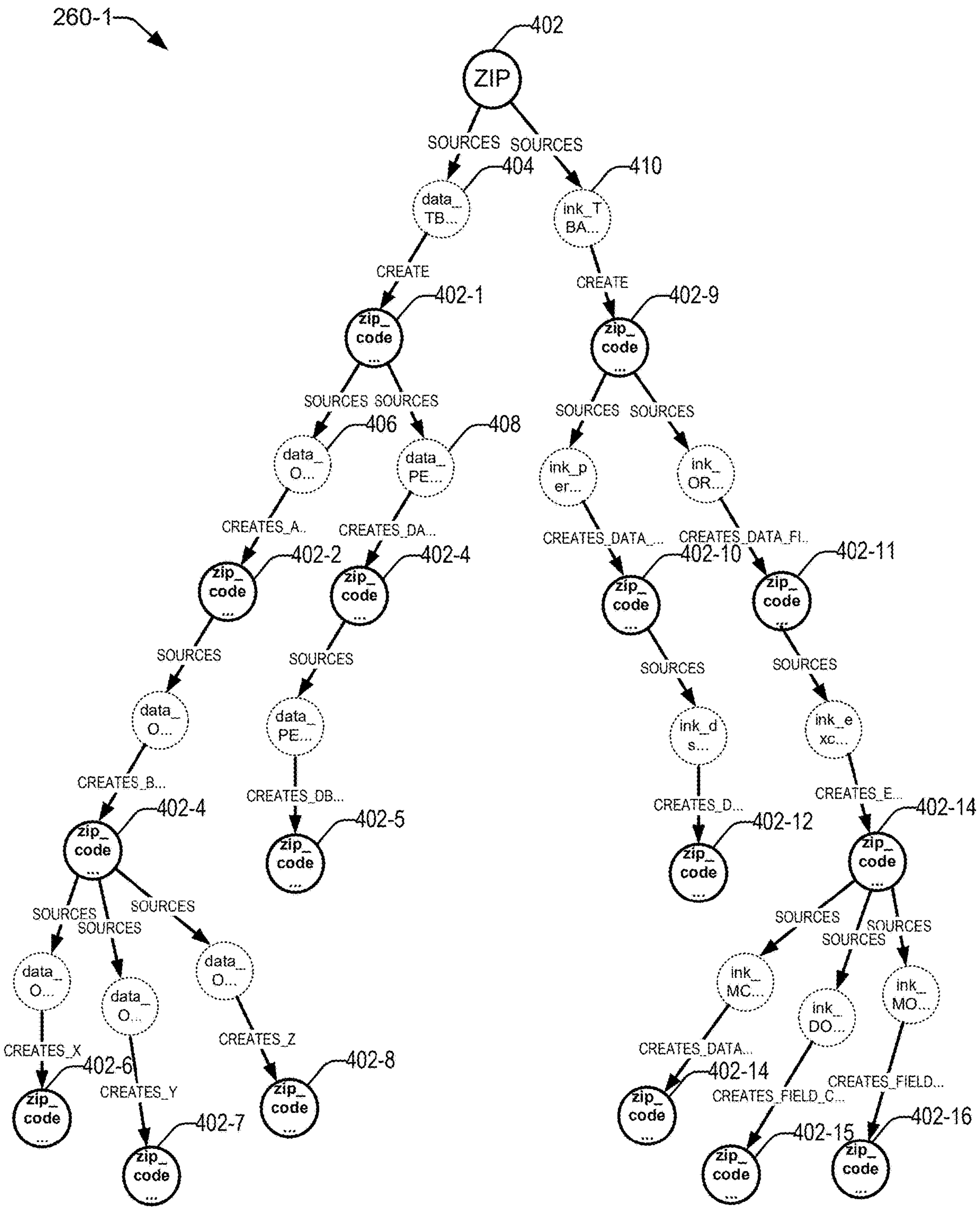
FIG. 4 illustrates a portion of an exemplary bloat reduction interface that may be used in presenting visualizations and providing bloat reduction features, in accordance with disclosed embodiments according to the present disclosure.

By way of example of some of the data bloat reduction features 250, FIG. 4 illustrates a portion of an exemplary bloat reduction interface 260-1 that may be used in presenting visualizations and providing bloat reduction features, in accordance with embodiments of the present disclosure. The bloat reduction interface 260-1 may be displayed and interacted with using a client computing device 102. The example depicted may correspond to a graphical representation of the similarity analyses results, similarities in data movement, identifiers and attributes of the units of execution that move the data, overlap for a plurality of units of execution in using particular data, and relationships between the data and the units of execution. The graphical representation may be presented as a composite structure that is constructed to show data relationships (e.g., common use and/or creation of instances of the same data and common origin) and/or similar structures of different unit of execution flows. The composite structure may be constructed to show a common data origin of different unit of execution flows. The composite structure may graphically illustrate the propagation of the particular data with additional instances of data, data operations, and units of execution being graphically aligned to show similarities. For example, additional instances of data, data operations, and units of execution may be arranged hierarchically with different levels corresponding to similar data instances, data operations, and units of execution that may, for example, be presented in parallel, to reflect the data propagation.

Portions of the depicted example may correspond to nodes that are graphically represented by the interface 260-1. Some nodes may correspond to places where particular data 402 land. Some nodes may correspond to parts of units of execution. The interface 260-1 may graphically indicate the particular data 402 and the parts of units of execution in any suitable manner (e.g., by way of color coding, line patterns, textual indicia, and/or the like). For the sake of description, in the example depicted, the particular data 402 are indicated with the circles with solid lines, and parts of units of execution are indicated with the circles with dashed lines. The arrows and labels connecting the nodes may indicate the flow of data from one node to another, with the sourcing of the data to some units of execution and the creation of fields (e.g., in a table, file, database, or other data structure) for instances of the data 402. Subsystem-identified potential data bloat may be graphically indicated in any suitable manner (e.g., with color coding, highlighting, additional graphics, etc.). For the sake of description, in the example depicted, the subsystem-identified potential data bloat is indicated with bolding.

In the depicted example, the flow of the composite structure may begin with one piece of data 402 as a common data origin. In this case, the particular piece of data 408 may happen to be a zip code piece of data, for example. As can be seen from the intelligent parallelization in which the overall structure has been constructed by the subsystem 200, one side of the flow may generally mirror the other side of the flow, a set of similarities which the learning engine 214 may have identified with the similarity analyses as a factor indicating a likely instance of data bloat. In this case, the data 402 may have been taken by unit of execution 404. Unit of execution 404 may have loaded an instance of the data into another field, which may correspond to creating a new instance and location of the data 402-1. That data 402-1 may be sourced to other units of execution 406 and 408. The units of execution 406 and 408 may likewise creating new instances and locations of the data 402-2 and 402-3. More units of execution may likewise continue the process of creating new data instances and locations, effectively pushing more copies of the same zip code data down to different endpoints such that many instances of the zip code are saved and stored in various fields and locations. Moreover, such a process of propagating the data 402 may have occurred along additional paths with the right side of the visualization, beginning with unit of execution 410 having created the instance of data 402-9 and continuing with more downstream units of execution having subsequently created new data instances and locations. Such a situation may have resulted from one or more teams needing the same structure of data and not knowing about other data structures already having been created. Thus, code may have been duplicated unnecessarily.

In some embodiments, each component of the graphical user interface 260-1 may be user-selectable to drill down and expose details of the component. For example, each node corresponding to data 402 (e.g., 402, 402-1, 402-2, etc.) may be selectable via an interface element to reveal details of the data 402 (e.g., with an interactive interface that may correspond to a pop-up window, a frame, new screen, etc.), such as the data type, the specific values of the data, an identifier of the field in which the data is placed, an identifier of the location at which the data is saved or otherwise stored, the time and date at which the data was instantiated, identifiers of one or more users and/or teams associated with the data instantiation, other metadata, and/or the like. Each node corresponding to a unit of execution (e.g., 404, 406, 408, etc.) may be selectable via an interface element to reveal details of the unit of execution, such as specific code, an identifier of the location at which the unit of execution is saved or otherwise stored, times and dates at which the unit of execution was created and/or modified, identifiers of one or more users and/or teams associated with the unit of execution, other metadata, and/or the like. By way of further example, in some embodiments, the interface 260-1 may be configured to allow for hover-to-reveal features where, for example, a user may hover over a particular component with a cursor. Responsive to the hover-over operation, a pop-up may be generated that may allow for drill-down into specific details of the component. Accordingly, with the bloat recognition features, the graphical user interface 260-1 may instantly indicate the exact nodes where potential data bloat may exist, efficiently providing a very clear view of instances of potential data bloat, how the potential data bloat emerged, and the relationships and characteristics of units of execution involved with the data bloat. Thus, a user need not spend a lot of time digging to identify data bloat, which may not even be possible to do effectively in large-scale systems.

In some embodiments, the graphical user interface 260-1 may include selectable interface options allowing for bloat reduction actions 262 (indicated with FIG. 2). For example, pop-ups revealed with selecting or hovering over a node may be selectable to manage identified data bloat with respect to a particular node (e.g., a data node 402, 402-1, etc., or a unit of execution node 404, 406, etc.) and make remote changes to unit of execution configurations to eliminate redundant extraction and/or generation operations for static and/or redundant data, reconfigure units of execution to re-reference to different instances of data, delete redundant instances of data, and/or delete or deactivate units of execution if such are unnecessary to generate data that has already been replicated one or more times.

As part of the smart alert 264 features indicated in FIG. 2, in some embodiments, the bloat reduction actions 262 may include causing transmitting of a service request to one or more responsible users associated with a unit of execution corresponding to the selected node to reconfigure the unit of execution to re-reference to a different instance of the data 402, delete or deactivate the unit of execution if it is unnecessary, delete one or more redundant instances of data. In some embodiments, such a representation of the visualization of the composite structure (e.g., a full or partial screenshot, a report summarizing at least part of the composite structure, and/or the like) or a hyperlink to the condensed representation or the composite structure visualized provided with interface 260-1 may be transmitted to select individual accounts, for example, via email, instant messaging, push messages, and/or the like to alert (in some embodiments, in real time or near real time consequent to the bloat identification process and visualization generation being completed) responsible individuals about the identified bloat and recommended actions.

Additionally or alternatively, in some embodiments, the bloat reduction actions 262 may include causing generation of a ticket to reconfigure the unit of execution to re-reference to a different instance of the data 402, delete or deactivate the unit of execution if it is unnecessary, delete one or more redundant instances of data. Additionally or alternatively, in some embodiments, a separate interface element may be selectable to take bloat reduction actions 262 and cause transmitting of a service request to a service system component of the system 100 to reconfigure the unit of execution to re-reference to a different instance of the data 402, delete or deactivate the unit of execution if it is unnecessary, and/or to generate a ticket to reconfigure or delete the unit of execution and/or delete redundant instances of data. In some embodiments, the bloat reduction actions 262 may include subsystem-acceleration of the service request with a set of objects and/or fields of the service requests and/or tickets that may be subsystem-populated using linked data, for example, with a composite 258 mapped to the selected node. In some embodiments, the subsystem 200 may automatically reconfigure the unit of execution to re-reference to a different instance of the data 402, delete or deactivate the unit of execution if it is unnecessary, and/or delete one or more redundant instances of data after a notification time period has expired and the subsystem 200 determines that no response to a subsystem-generated notification and/or service request has been received or no action has been taken to reconfigure the unit of execution to re-reference to a different instance of the data 402, delete or deactivate the unit of execution if it is unnecessary, delete one or more redundant instances of data In some embodiments, the subsystem 200 may be configured to provide feedback loop features. For example, the subsystem 200 may provide the interface 260 with feedback options to facilitate an ongoing learning mode to confirm and/or correct the data bloat determinations. User-selectable options provided with notifications (e.g., push notifications to the client computing devices 102, pop-up/modal windows with the interface 260, and/or the like) may be provided to allow administrative confirmation or correction of data bloat determinations. The feedback may also be used for training the subsystem 200 models to heuristically adapt data bloat recognition and/or characterizations.

In some embodiments, the subsystem 200 may allow a user to input an identifier of particular data (which may, for example, correspond to one of the data nodes) and/or an identifier of a unit of execution (which may, for example, correspond to one of the unit of execution nodes) as a query. The subsystem 200 may then identify units of execution related to the input, performing one or more of the data bloat reduction features 250 as a function of the input. A visualization of the identified units of execution may be generated and exposed via the GUI 260. Accordingly, the subsystem 200 may provide for a bottom-up search functionality in addition to the top-down functionality described above.

Figure 5:
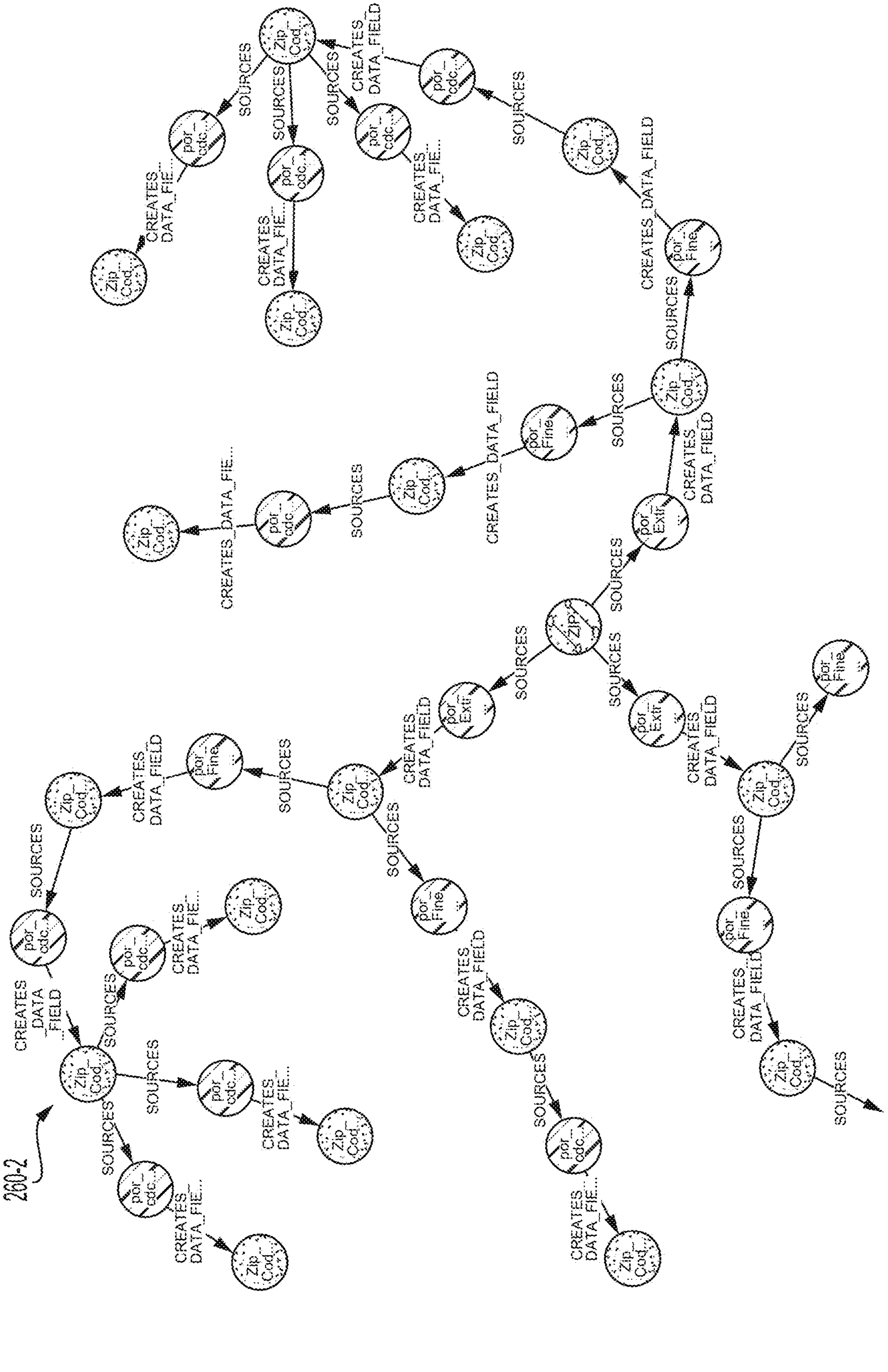
FIG. 5 illustrates a portion of another example of a visualization with the bloat reduction interface 260-2, in accordance with embodiments of the present disclosure.

FIG. 5 illustrates a portion of another example of a visualization with the bloat reduction interface 260-2, in accordance with embodiments of the present disclosure. The visualization is an example of a more complex composite structure that can be presented with the bloat reduction interface 260. As can be seen, the composite structure can include many more nodes and relatively long chains. Moreover, the composite structure flow may be asymmetrical. This illustrates some of the advantages provided by embodiments disclosed herein because, without disclosed embodiments, it would be very time-consuming, effort-intensive, and practically impossible to traverse the data and units of execution of the system 100 in order to identify data bloat considering the large-scale complexities involved.

Figure 6:
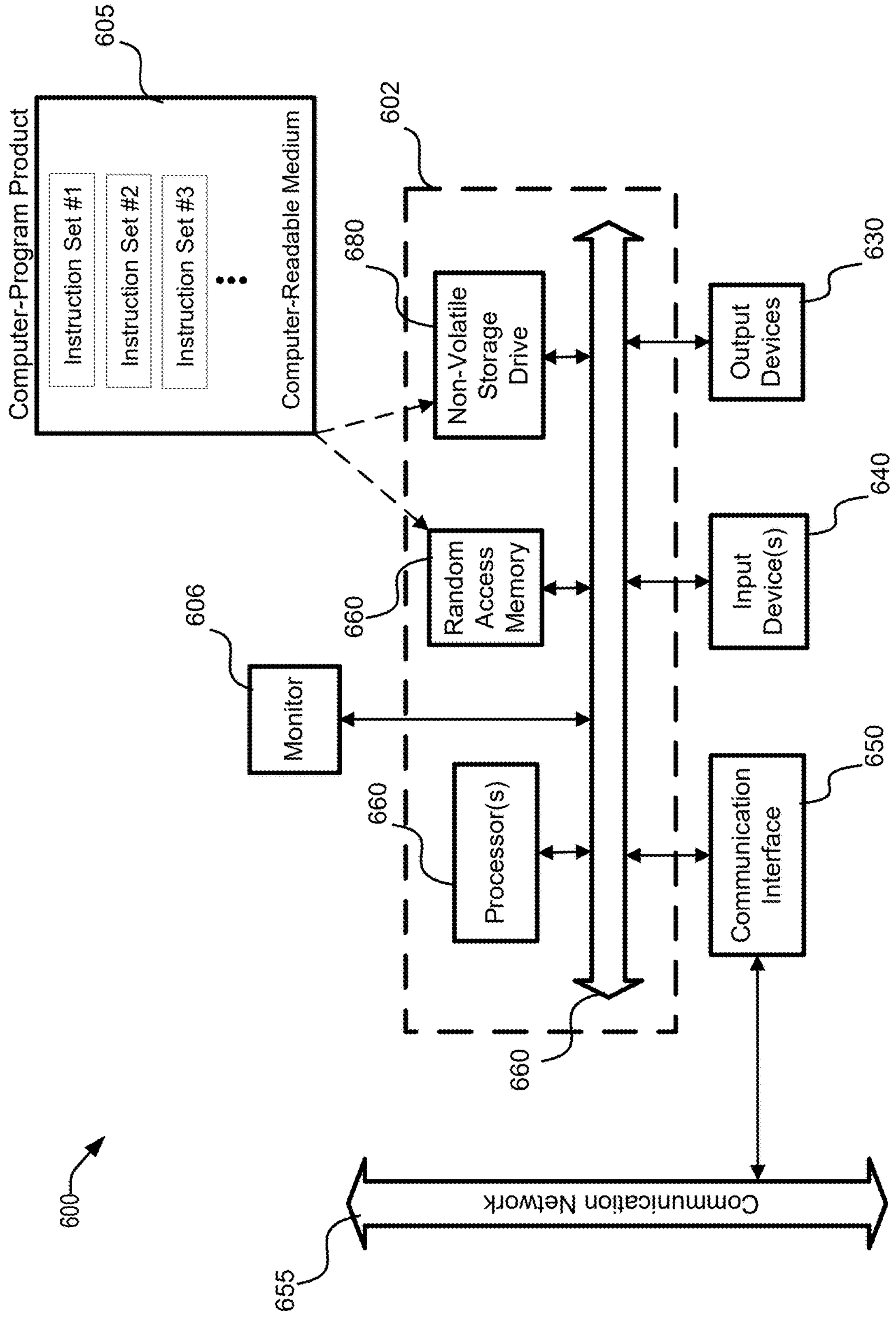
FIG. 6 illustrates a special-purpose computer system, in accordance with disclosed embodiments according to the present disclosure.

With reference to FIG. 6, an embodiment of a special-purpose computer system 600 is shown. The above methods may be implemented by computer-program products that direct a computer system to perform the actions of the above-described methods and operations. In various embodiments, the special-purpose computer system 600 may at least partially implement the subsystem 200. In various embodiments, the computer system 600 may correspond at least in part to one or more of the job optimizer 202, the client computing devices 102, the server system 130, the cloud infrastructure system 130-1, and/or the remote system 140. Each such computer-program may comprise sets of instructions (codes) embodied on a computer-readable medium that directs the processor of a computer system to perform corresponding actions. The instructions may be configured to run in sequential order, or in parallel (such as under different processing threads), or in a combination thereof. Merely by way of example, one or more procedures described with respect to the method(s) discussed herein might be implemented as code and/or instructions executable by a computer (and/or a processor within a computer); in an aspect, then, such code and/or instructions can be used to configure and/or adapt a general purpose computer (or other device) to perform one or more operations in accordance with the described methods, transforming the computer into the special-purpose computer system 600.

As discussed further herein, according to a set of embodiments, some or all of the procedures of such methods are performed by the computer system 600 in response to processor-execution of one or more sequences of one or more instructions (which might be incorporated into the operating system and/or other code, such as an application program) contained in the operating memory. Such instructions may be read into the operating memory from another computer-readable medium, such as one or more of the non-transitory storage device(s). Merely by way of example, execution of the sequences of instructions contained in the operating memory might cause the processor(s) to perform one or more procedures of the methods described herein.

Special-purpose computer system 600 may include a computer 602, a monitor 606 coupled to computer 602, one or more additional user output devices 630 (optional) coupled to computer 602, one or more user input devices 640 (e.g., joystick, keyboard, mouse, track ball, touch screen buttons, switches, control handles, and/or the like) coupled to computer 602, a communications interface 650 coupled to computer 602, a computer-program 605 stored in a tangible computer-readable memory in computer 602. Computer program 605 directs system 600 to perform the above-described methods. Computer 602 may include one or more processors 660 that communicate with a number of peripheral devices via a bus subsystem 690. These peripheral devices may include user output device(s) 630, user input device(s) 640, communications interface 650, and a storage subsystem, such as random-access memory (RAM) 670 and non-volatile storage drive 680 (e.g., disk drive, optical drive, solid state drive), which are forms of tangible computer-readable memory.

Computer program 605 may be stored in non-volatile storage drive 680 or another computer-readable medium accessible to computer 602 and loaded into memory 670. Each processor 660 may comprise a microprocessor, such as a microprocessor from Intel® or Advanced Micro Devices, Inc.®, or the like. To support computer-program 605, the computer 602 runs an operating system that handles the communications of 605 with the above-disclosed components, as well as the communications between the above-disclosed components in support of the computer-program 605. Exemplary operating systems include Windows® or the like from Microsoft® Corporation, Solaris® from Oracle®, LINUX, UNIX, and the like. The processors 660 may include one or more special-purpose processors such as digital signal processing chips, graphics acceleration processors, video decoders, image processors, and/or the like.

User input devices 640 include all possible types of devices and mechanisms to input information to computer system 602. These may include a keyboard, a keypad, a mouse, a scanner, buttons, control handles, switches, a digital drawing pad, a touch screen incorporated into the display, audio input devices such as voice recognition systems, microphones, and other types of input devices. In various embodiments, user input devices 640 may be embodied as a computer mouse, a trackball, a track pad, a joystick, buttons, control handles, switches, wireless remote, a drawing tablet, a voice command system. User input devices 640 typically allow a user to select objects, icons, text and the like that appear on the monitor 606 via a command such as a click of a button or the like. User output devices 630 include all possible types of devices and mechanisms to output information from computer 602. These may include a display (e.g., monitor 606), printers, non-visual displays such as audio output devices, etc. Some embodiments may not have a separate monitor 606, but may have the monitors integrated with input devices and/or output devices, such as mobile devices, touchscreen devices, etc.

Communications interface 650 provides an interface to other communication networks 655 and devices and may serve as an interface to receive data from and transmit data to other systems, WANs and/or the Internet. Embodiments of communications interface 650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 650 may be coupled to a computer network, to a FireWire® bus, or the like. In other embodiments, communications interface 650 may be physically integrated on the motherboard of computer 602, and/or may be a software program, or the like. In further examples, the communications interface 650 may be part of a communications subsystem, which can include without limitation a modem, a network card (wireless or wired), an infrared communication device, a wireless communication device, and/or a chipset (such as a Bluetooth™ device, BLE, an 802.11 device, an 802.15.4 device, a Wi-Fi device, a WiMAX device, cellular communication device, etc.), and/or the like. The communications subsystem may permit data to be exchanged with a network (such as the network described below, to name one example), other computer systems, and/or any other devices described herein.

RAM 670 and non-volatile storage drive 680 are examples of tangible computer-readable media configured to store data such as computer-program embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 670 and non-volatile storage drive 680 may be configured to store the basic programming and data constructs that provide the functionality of various embodiments of the present invention, as described above. The above are examples of one or more non-transitory storage devices that may be utilized by the system 600. Such storage devices may be configured to implement any appropriate data stores, including without limitation, various file systems, database structures, and/or the like.

Software instruction sets that provide the functionality of the present invention may be stored in RAM 670 and non-volatile storage drive 680. These instruction sets or code may be executed by the processor(s) 660. RAM 670 and non-volatile storage drive 680 may also provide a repository to store data and data structures used in accordance with the present invention. RAM 670 and non-volatile storage drive 680 may include a number of memories including a main random access memory (RAM) to store of instructions and data during program execution and a read-only memory (ROM) in which fixed instructions are stored. RAM 670 and non-volatile storage drive 680 may include a file storage subsystem providing persistent (non-volatile) storage of program and/or data files. RAM 670 and non-volatile storage drive 680 may also include removable storage systems, such as removable flash memory. Bus subsystem 670 provides a mechanism to allow the various components and subsystems of computer 602 communicate with each other as intended. Although bus subsystem 670 is shown schematically as a single bus, alternative embodiments of the bus subsystem may utilize multiple busses or communication paths within the computer 602.

The above methods may be implemented by computer-program products that direct a computer system to control the actions of the above-described methods and components. Each such computer-program may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random access memory (RAM) and non-volatile storage drive (e.g., disk drive, optical drive, solid state drive), which are forms of tangible computer-readable memory.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The terms "computer-readable medium," "computer-readable media," "processor-readable medium," "processor-readable media," "machine-readable medium," and "machine-readable media," include, but are not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system for automatically performing one or more bloat reduction operations to remediate replicative data instances, the system comprising:

- one or more processing devices and memory communicatively coupled with and readable by the one or more processing devices, the memory comprising processor-readable instructions which, when executed by the one or more processing devices, cause the system to perform operations comprising:
  - collecting metadata mapped to units of execution executed by one or more components of a computing infrastructure and data created and/or used by the units of execution;
  - consolidating the metadata into one or more data repositories;
  - analyzing the consolidated metadata to identify units of execution mapped to similar or replicative data instances;
  - based at least in part on the identified units of execution mapped to the similar or replicative data instances, determining one or more instances of potential data bloat mapped to at least a subset of the identified units of execution;
  - developing execution composites that comprise specifications of at least part of the subset of the identified units of execution to facilitate a bloat reduction interface;
  - based at least in part on the one or more execution composites, generating the bloat reduction interface to graphically represent propagation of data corresponding to at least some of the similar or replicative data instances from a common origin through units of execution, represented as nodes, of at least the subset of identified units of execution, wherein the nodes are user-selectable to facilitate one or more bloat reduction actions with respect to one or more units of execution of the subset of identified units of execution; and
  - consequent to a user selection of one of the nodes, automatically performing: a first bloat reduction action by making a remote change to a first unit of execution by reconfiguring, deleting, or deactivating the first unit of execution; and a second bloat reduction action by making a remote change to a second unit of execution by reconfiguring, deleting, or deactivating the second unit of execution based at least in part on a data lineage of the subset identified at least in part by analyses of metadata relationships and similarities of the subset of identified units of execution.

2. The system for automatically performing one or more bloat reduction operations to remediate replicative data instances as recited in claim 1, the operations further comprising causing scanning of the one or more components of a computing infrastructure and the data created and/or used by the units of execution to identify or create the metadata.

3. The system for automatically performing one or more bloat reduction operations to remediate replicative data instances as recited in claim 1, wherein the consolidating the metadata into the one or more data repositories comprises developing a graph database based at least in part on the metadata, and the identifying the units of execution mapped to the similar or replicative data instances is based at least in part on similarity analyses of subgraphs of the graph database.

4. The system for automatically performing one or more bloat reduction operations to remediate replicative data instances as recited in claim 1, wherein the bloat reduction interface graphically indicates a composite structure that is constructed to indicate data relationships of the subset of identified units of execution.

5. The system for automatically performing one or more bloat reduction operations to remediate replicative data instances as recited in claim 4, wherein the bloat reduction interface graphically indicates how the one or more instances of potential data bloat emerged in the computing infrastructure.

6. The system for automatically performing one or more bloat reduction operations to remediate replicative data instances as recited in claim 4, wherein the bloat reduction interface comprises user-selectable interface elements corresponding to data nodes and unit of execution nodes of the composite structure.

7. The system for automatically performing one or more bloat reduction operations to remediate replicative data instances as recited in claim 6, wherein the user-selectable interface elements are selectable to cause the one or more bloat reduction actions with respect to a selected data node and/or a selected unit of execution node.

8. One or more non-transitory, processor-readable media having processor-readable instructions thereon which, when executed by one or more processing devices, cause a system to perform operations comprising:

collecting metadata mapped to units of execution executed by one or more components of a computing infrastructure and data created and/or used by the units of execution;

consolidating the metadata into one or more data repositories;

analyzing the consolidated metadata to identify units of execution mapped to similar or replicative data instances;

based at least in part on the identified units of execution mapped to the similar or replicative data instances, determining one or more instances of potential data bloat mapped to at least a subset of the identified units of execution;

developing execution composites that comprise specifications of at least part of the subset of the identified units of execution to facilitate a bloat reduction interface;

based at least in part on the one or more execution composites, generating the bloat reduction interface to graphically represent propagation of data corresponding to at least some of the similar or replicative data instances from a common origin through units of execution, represented as nodes, of at least the subset of identified units of execution, wherein the nodes are user-selectable to facilitate one or more bloat reduction actions with respect to one or more units of execution of the subset of identified units of execution; and consequent to a user selection of one of the nodes, automatically performing: a first bloat reduction action by making a remote change to a first unit of execution by reconfiguring, deleting, or deactivating the first unit of execution; and a second bloat reduction action by making a remote change to a second unit of execution by reconfiguring, deleting, or deactivating the second unit of execution based at least in part on a data lineage of the subset identified at least in part by analyses of metadata relationships and similarities of the subset of identified units of execution.

9. The one or more non-transitory, processor-readable media as recited in claim 8, the operations further comprising causing scanning of the one or more components of a computing infrastructure and the data created and/or used by the units of execution to identify or create the metadata.

10. The one or more non-transitory, processor-readable media as recited in claim 8, wherein the consolidating the metadata into the one or more data repositories comprises developing a graph database based at least in part on the metadata, and the identifying the units of execution mapped to the similar or replicative data instances is based at least in part on similarity analyses of subgraphs of the graph database.

11. The one or more non-transitory, processor-readable media as recited in claim 8, wherein the bloat reduction interface graphically indicates a composite structure that is constructed to indicate data relationships of the subset of identified units of execution.

12. The one or more non-transitory, processor-readable media as recited in claim 11, wherein the bloat reduction interface graphically indicates how the one or more instances of potential data bloat emerged in the computing infrastructure.

13. The one or more non-transitory, processor-readable media as recited in claim 11, wherein the bloat reduction interface comprises user-selectable interface elements corresponding to data nodes and unit of execution nodes of the composite structure.

14. The one or more non-transitory, processor-readable media as recited in claim 13, wherein the user-selectable interface elements are selectable to cause the one or more bloat reduction actions with respect to a selected data node and/or a selected unit of execution node.

15. A method for automatically performing one or more bloat reduction operations to remediate replicative data instances, the method comprising:

collecting metadata mapped to units of execution executed by one or more components of a computing infrastructure and data created and/or used by the units of execution;

consolidating the metadata into one or more data repositories;

analyzing the consolidated metadata to identify units of execution mapped to similar or replicative data instances;

based at least in part on the identified units of execution mapped to the similar or replicative data instances, determining one or more instances of potential data bloat mapped to at least a subset of the identified units of execution;

developing execution composites that comprise specifications of at least part of the subset of the identified units of execution to facilitate a bloat reduction interface;

based at least in part on the one or more execution composites, generating the bloat reduction interface to graphically represent propagation of data corresponding to at least some of the similar or replicative data instances from a common origin through units of execution, represented as nodes, of at least the subset of identified units of execution, wherein the nodes are user-selectable to facilitate one or more bloat reduction actions with respect to one or more units of execution of the subset of identified units of execution; and consequent to a user selection of one of the nodes, automatically performing: a first bloat reduction action by making a remote change to a first unit of execution by reconfiguring, deleting, or deactivating the first unit of execution; and a second bloat reduction action by making a remote change to a second unit of execution by reconfiguring, deleting, or deactivating the second unit of execution based at least in part on a data lineage of the subset identified at least in part by analyses of metadata relationships and similarities of the subset of identified units of execution.

16. The method for automatically performing one or more bloat reduction operations to remediate replicative data instances as recited in claim 15, the operations further comprising causing scanning of the one or more components of a computing infrastructure and the data created and/or used by the units of execution to identify or create the metadata.

17. The method for automatically performing one or more bloat reduction operations to remediate replicative data instances as recited in claim 15, wherein the consolidating the metadata into the one or more data repositories comprises developing a graph database based at least in part on the metadata, and the identifying the units of execution mapped to the similar or replicative data instances is based at least in part on similarity analyses of subgraphs of the graph database.

18. The method for automatically performing one or more bloat reduction operations to remediate replicative data instances as recited in claim 15, wherein the bloat reduction interface graphically indicates a composite structure that is constructed to indicate data relationships of the subset of identified units of execution.

19. The method for automatically performing one or more bloat reduction operations to remediate replicative data instances as recited in claim 18, wherein the bloat reduction interface graphically indicates how the one or more instances of potential data bloat emerged in the computing infrastructure.

20. The method for automatically performing one or more bloat reduction operations to remediate replicative data instances as recited in claim 18, wherein the bloat reduction interface comprises user-selectable interface elements corresponding to data nodes and unit of execution nodes of the composite structure.

* * * * *